(12) United States Patent
Budhabhatti et al.

(10) Patent No.: US 8,055,681 B2
(45) Date of Patent: Nov. 8, 2011

(54) DATA STORAGE METHOD AND DATA STORAGE STRUCTURE

(75) Inventors: Bhavesh Dhanji Budhabhatti, Bangalore (IN); Yonghua Lin, Beijing (CN); Chien D. Vu, Durham, NC (US); Yan Qi Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 419 days.

(21) Appl. No.: 12/139,128

(22) Filed: Jun. 13, 2008

(65) Prior Publication Data

US 2008/0281773 A1    Nov. 13, 2008

Related U.S. Application Data

(63) Continuation of application No. 11/513,475, filed on Aug. 31, 2006, now abandoned.

(30) Foreign Application Priority Data

Aug. 31, 2005    (CN) .......................... 2005 1 0097937

(51) Int. Cl.
*G06F 7/00* (2006.01)
*G06F 17/30* (2006.01)
(52) U.S. Cl. .................... 707/791; 707/803; 707/812
(58) Field of Classification Search ............... 707/999.2, 707/609, 791, 803, 812
See application file for complete search history.

(56) References Cited

U.S. PATENT DOCUMENTS

| | | | |
|---|---|---|---|
| 5,325,325 A | 6/1994 | Azuma | |
| 5,530,854 A | 6/1996 | Emery et al. | |
| 6,049,802 A | 4/2000 | Waggener, Jr. et al. | |
| 6,230,151 B1 | 5/2001 | Agrawal et al. | |
| 6,334,125 B1 | 12/2001 | Johnson et al. | |
| 6,714,943 B1 * | 3/2004 | Ganesh et al. ........................ | 1/1 |
| 6,721,723 B1 | 4/2004 | Gibson et al. | |
| 6,785,674 B2 | 8/2004 | Vu | |
| 2002/0095397 A1 * | 7/2002 | Koskas ............................. | 707/1 |
| 2003/0009482 A1 | 1/2003 | Benerjee et al. | |
| 2004/0006568 A1 | 1/2004 | Ooi et al. | |
| 2004/0243563 A1 | 12/2004 | Heiner et al. | |

* cited by examiner

*Primary Examiner* — Yicun Wu
*Assistant Examiner* — Alexey Shmatov
(74) *Attorney, Agent, or Firm* — Scully, Scott, Murphy & Presser, P.C.; William Stock, Esq.

(57) ABSTRACT

In one aspect, a method of storing data includes setting a first data node in a first storage area and setting a second data node in a second storage area. The second data node is an element of a plurality of elements forming a first flat table of at least one flat table in the second storage area. The step of setting a first data node includes storing in the first data node a two-tuple linker which comprises a first identifier indicating the first flat table and a second identifier indicating the row of the element in the first flat table. In another aspect a corresponding data storage structure is further provided.

16 Claims, 2 Drawing Sheets

DATA STORAGE METHOD AND DATA STORAGE STRUCTURE

RELATED APPLICATIONS

Figure 1:
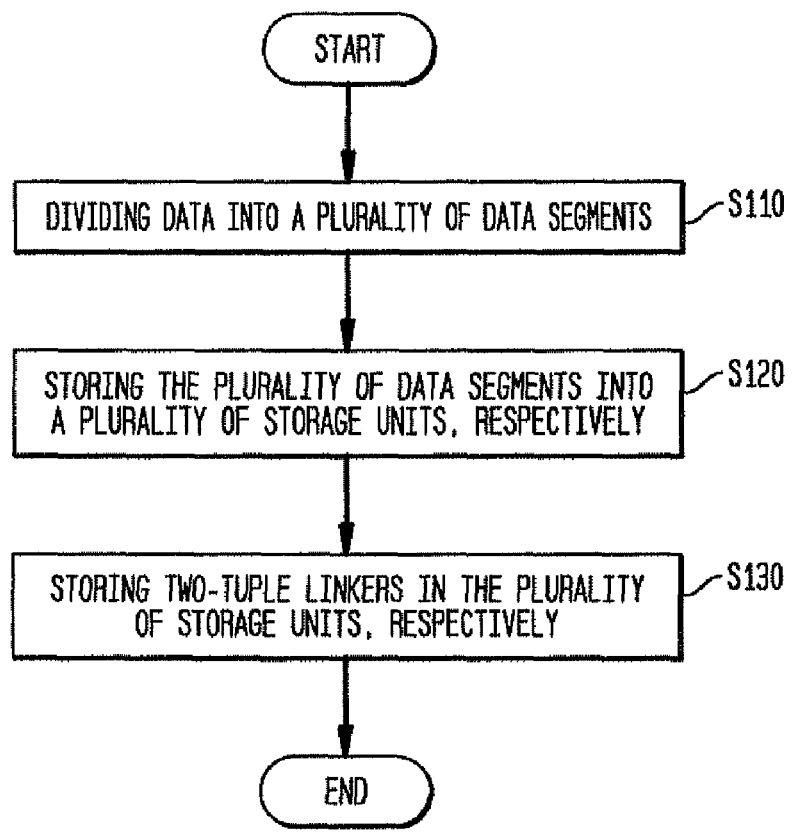

This application is a continuation of U.S. Ser. No. 11/513,475, filed Aug. 31, 2006, the entire contents of which are incorporated herein by reference.

FIELD OF THE INVENTION

The present invention relates to a data storage method and a data storage structure, and more particularly, to a data storage method and a data storage structure for use in a special-purpose processor that does not support a pointer.

BACKGROUND OF THE INVENTION

A special-purpose processor, like a mathematical processor which serves as a coprocessor of a universal processor and performs mathematical operations, and a network processor which is used for processing network services (switches, routers etc) or the like, is a high-performance processor that is specifically designed for some specific applications.

However, as special applications demand, a special-purpose processor may have to trade some of its flexibility for realization of its specific functions. In general, a special-purpose processor employs a collection of high-performance hardware engines, and each of them is crafted to support specific functions, such as queue management, table lookup, and access to memory or the like. In order to achieve higher performance, a special-purpose processor often adopts a memory structure which departs from the conventional memory hierarchy (e.g., main memory, cache memory or the like). In a special-purpose processor, memory are often partitioned into control memory which houses host information for data processing and data memory which houses data accompanying requests for processing.

In a special-purpose processor which employs at least a search engine, an index table can be implemented for fast lookup. Therefore, there are at least two types of tables supported in such special-purpose processor: index table and flat table. An index table can be implemented as an index tree which is a limited set formed by n (n≧0) nodes and includes a root node, leaf nodes (end nodes) and non-end nodes. Usually, relevant information is stored in leaf nodes. The path from the root node of the index tree to a leaf node is identified by a key in the index table. A user can access an index table by providing a tree ID and a key and then invoking a table lookup (index tree search) command. Latency of a lookup depends on the length of the key and the structure of the tree.

A flat table can be implemented as a memory array. Each row or column of a memory array may store a row (element) of a flat table.

In data processing, data chaining allows data to be well-linked logically, thereby reducing spatial requirements on storage unit while keeping data integrity at the same time. The flexibility of software design of data processing heavily depends on the single pointer as a single and simple mechanism of data chaining.

Due to use for special applications, a special-purpose processor often does not support memory access via a pointer (address of a memory location) and consequently, loses the capability of data chaining via a single pointer. The lack of such a single pointer prevents data chaining from being implemented easily and results in worse flexibility of software design.

Because of upper limit on the size of a leaf node, the capacity of information that can be stored in a leaf node is also restricted. As a result, demands of some complex applications (e.g., tunneling application involved in network communication, or the like) cannot be met. Therefore, there is a need to expand the information capacity of a leaf node, for example.

However, since a special-purpose processor lacks the capability of data chaining via a single pointer, the efficiency of data chaining is rather low, which gives rise to a conflict between large data and small capacity of data storage unit.

SUMMARY OF THE INVENTION

It is an object of the present invention to provide a data storage method and a data storage structure to enable a special-purpose processor to achieve data chaining easily and expand storage capacity of a data node.

According to an aspect of the present invention, a method of storing data is provided, the method comprising the steps of:
  setting a first data node in a first storage area;
  setting a second data node in a second storage area;
  wherein said second data node is an element of a plurality of elements forming a first flat table of at least one flat table in the second storage area;
  and said step of setting the first data node includes storing in the first data node a two-tuple linker which comprises a first identifier indicating said first flat table and a second identifier indicating the row of said element in the first flat table.

According to another aspect of the present invention, a data storage structure is also provided, which comprising:
  a first data node set in a first storage area;
  a second data node set in a second storage area;
  wherein said second data node is an element of a plurality of elements forming a first flat table of the at least one flat table in the second storage area;
  and said first data node contains a two-tuple linker which comprises a first identifier indicating the first flat table and a second identifier indicating the row of said element in the first flat table.

According to the present invention, it is able to achieve easily data chaining via a two-tuple linker in a special-purpose processor that does not support a pointer of memory address. For instance, in a memory hierarchy in a form of flat table, each flat table is identified by a table identifier, and each row of a flat table is identified by a corresponding element identifier. By means of the flat table identifier and the element identifier in a two-tuple linker, the present invention realizes chaining with data nodes or storage units that serve as elements of a flat table, thereby reducing spatial requirements on a special storage unit or a data node for storing data and enhancing efficiency of chaining each data.

Other features and advantages of the present invention will become apparent from the following description, taken in conjunction with the accompanying drawings wherein the same reference numerals denote identical or like parts.

BRIEF DESCRIPTION ON THE DRAWINGS

Figure 2:
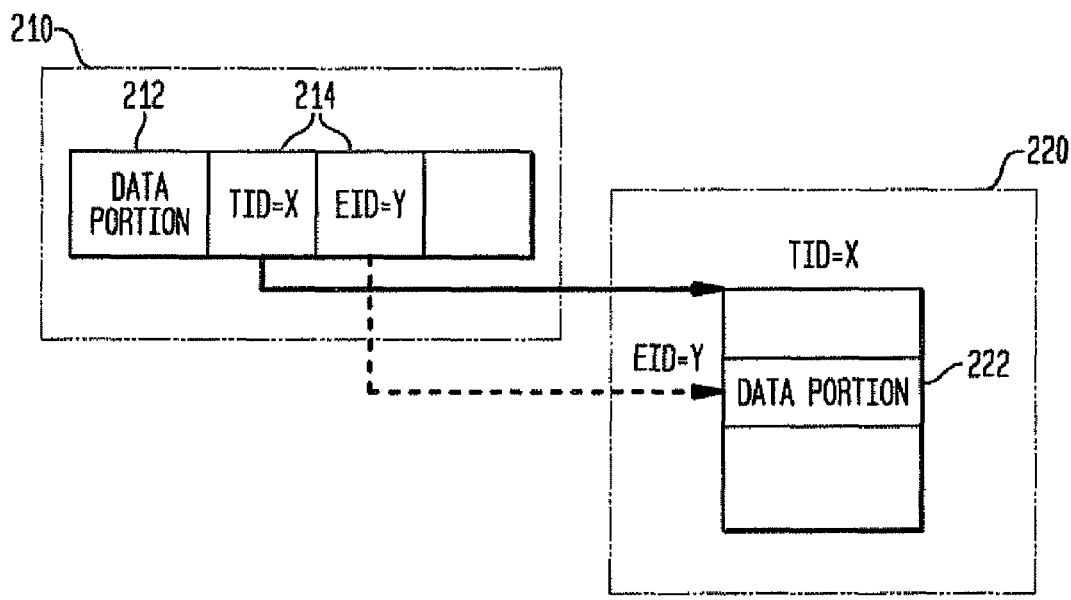
Figure 3:
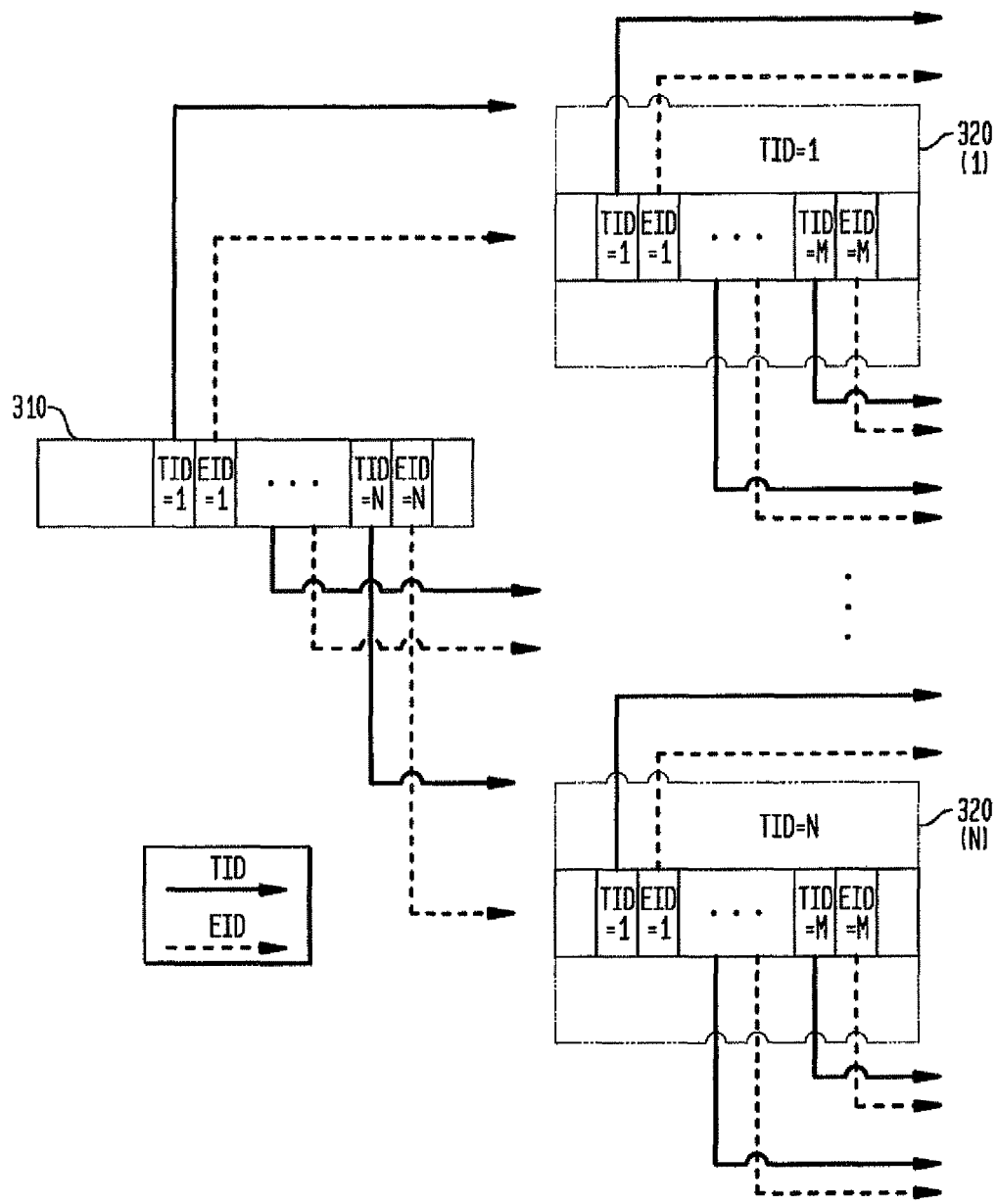

The novel features believed as characteristics of the invention are set forth in the appended claims. The invention itself, however, as well as a preferred mode of use, further objectives and advantages thereof, will best be understood by reference to the following detailed description of an illustratively embodiment when read in conjunction with the accompanying drawings, wherein FIG. 1 is a flow chart of a data storage method according to an embodiment of the present invention;

FIG. 2 is a schematic view of a data storage structure according to another embodiment of the present invention; and FIG. 3 is a schematic view of a data storage structure according to a further embodiment of the present invention.

DESCRIPTION OF THE PREFERRED EMBODIMENTS

The preferred embodiments and the advantages of the present invention will be better understood with reference to the accompanying drawings.

As various specific details are provided for a comprehensive understanding of the present invention in the following discussion, those skilled in the art should understand that the present invention can be carried out without these specific details. In the description of the embodiments, well-known components are illustrated in a form of schematic or block diagrams so as to prevent unnecessary details from obscuring the present invention.

To solve the problem that a special-purpose processor fails to perform data chaining via a pointer, according to an embodiment of the present invention, a scheme of performing data chaining via a two-tuple linker is proposed, so that the function of data chaining can be easily implemented in a special-purpose processor that does not support a pointer.

In detail, data to be stored in a data storage structure is segmented into multiple data segments, each data segment is stored to a storage unit that can accommodate this data segment, and accordingly, a two-tuple linker is also stored to this storage unit. With this two-tuple linker, the data segment stored in this storage unit is chained with a next data segment stored in another storage unit.

FIG. 1 shows a data storage method according to an embodiment of the present invention. As shown in FIG. 1, the data storage method includes the steps of: segmenting data to be stored to a data storage structure into a plurality of data segments (step S110); storing said plurality of data segments to a plurality of storage units, respectively (step S120); and storing a two-tuple linker to each of said plurality of storage units except for the one used for storing the last data segment (step S130), so that a data segment stored in a storage unit is chained with a next data segment stored in another storage unit via this two-tuple linker. In other words, the stored two-tuple linker points to a next data segment.

Of course, a storage unit may also store only a two-tuple linker, which is caused to point to a first data segment, and do not store any data segment.

By means of chaining of each data segment, storage units used for storing all data segments are logically chained. In this chain of storage units, each storage unit stores a data segment and a two-tuple linker except that the last storage unit stores only the last data segment. Of course, the first storage unit may store only the first two-tuple linker, while the first data segment is stored in the second storage unit. In this case, the first storage unit stores only the first two-tuple linker, the last storage unit stores only the last data segment, and other storage units store both a data segment and a two-tuple linker.

Under normal situations, the first storage unit of a chain of storage unit may house information in a leaf node (logically primary leaf) of an index tree, and other storage units of this chain of storage unit store a two-tuple linker and/or data segment in a form of elements of a flat table, as extension of this leaf node.

In this case, the used two-tuple linker may include a flat table identifier TID and an element identifier EID, wherein the flat table identifier TID points to the table number of the flat table where the next data segment is located, and the element identifier EID points to the element number or row number of the flat table where this data segment is located. Elements in the flat table may be accessed via the flat table identifier TID and element identifier EID. Both flat table identifier TID and element identifier EID are software-defined elements in one embodiment.

When a task is initiated, a processing engine or processor utilizes the input data for a tree lookup. After a match occurs, i.e., a proper logic primary leaf is found, when needed, the processor can utilizes a two-tuple linker {TID, EID} to read information in the logically extended leaf.

FIG. 2 illustrates a data storage structure according to a preferred embodiment of the present invention. As shown in FIG. 2, the data storage structure according to the present invention comprises a first storage unit 210 and a second storage unit 220. The first storage unit 210 comprises a first data segment 212 and a first two-tuple linker 214, where the first two-tuple linker 214 points to a second data segment 222 included in the second storage unit 220. For instance, the second data segment 222 included in the second storage unit 220 may be accessed by providing the first two-tuple linker 214.

The first storage unit 210 may be not spatially adjacent to the second storage unit 220, so long as there exists such corresponding logic relation that the second data segment 222 inside the second storage unit 220 can be accessed by means of the first two-tuple linker 214 in the first storage unit 210.

Of course, those skilled in the art should understand that the first storage unit 210 may include the first two-tuple linker 214 only, i.e., the first storage unit 210 may not include the first data segment 212.

The above-described data storage structure may further include a third storage unit (not shown) for storing a third data segment. In this case, the second storage unit 220 needs to include a second two-tuple linker which points to the third data segment.

Those skilled in the art can conceive that the data storage structure may also include a fourth storage unit, a fifth storage unit, etc., each of which includes a corresponding data segment. The number of storage units included is not supposed to limit the present invention. Of course, those skilled in the art should understand that each storage unit may store only one two-tuple linker or store a plurality of two-tuple linkers according to needs.

FIG. 3 illustrates a data storage structure according to another embodiment of the present invention. As shown in FIG. 3, the data storage structure comprises multiple cascades of storage unit (only two cascades are shown in this figure). The first cascade of storage unit 310 includes one storage unit, the second cascade of storage unit 320 includes N storage units, and the third cascade of storage unit includes M×N storage units (not shown).

The first cascade of storage unit 310 includes N two-tuple linkers, which point to N flat table elements stored respectively in the N storage units of the second cascade of storage unit 320, respectively. Each of storage units of the second cascade of storage unit 320 includes M two-tuple linkers, which point to M flat table elements stored respectively in the M storage units of the third cascade of storage unit, respectively.

Each cascade of storage unit may also store corresponding data segments according to needs. This cascading mechanism is of great use in applications such as load balance (both N and M are positive integers greater than 1). Clearly, the new data chaining mechanism (data storage method) can provide the chaining capability which a special-purpose processor had traded for its performance gain. And this new data chaining eliminates the physical limitation on memory (i.e., physical limitation of the leaf capacity).

Those skilled in the art can conceive that the data structure applicable is not limited to the tree structure so long as multiple data segments can be chained together via two-tuple linkers. Data structures do not constitute any limitation to the present invention.

Those skilled in the art should understand the aforesaid data segments may include various types of data, such as integer, float and string or the like.

The data storage structure and data storage method according to the preferred embodiments of the present invention may be applied to the above-described special-purpose processor or other processors. The type of applicable processors does not constitute any limitation to the present invention.

It should be noted that all the functions described here may be implemented by hardware or software or a combination thereof, unless otherwise specified.

A basic idea of the present invention is to provide, via a two-tuple linker, data chaining in a special-purpose processor that does not support a memory address pointer, so as to break through the limitation on space needed for data storage and enhance the efficiency of chaining each data segment.

The description of the present invention has been presented for purposes of illustration and description, and is not intended to be exhaustive or limit the invention to the form as disclosed. Various modification and variations will be apparent to those of ordinary skill in the art. The embodiment was chosen and described in order to best explain the principles of the invention, the practical application, and to enable others of ordinary skill in the art to understand that all modifications and alterations made without departing from the spirit of the present invention fall into the protection scope of the present invention as defined in the appended claims.

What is claimed is:

1. A method of storing data, comprising the steps of:
   segmenting data to be stored in a data storage structure into a plurality of data segments;
   storing said plurality of data segments to a plurality of storage units in a form of a flat table, respectively;
   storing a two-tuple linker as part of the flat table to each of said plurality of storage units except for one used to store the last data segment of the plurality of data segments, the two-tuple linker chaining a data segment stored in a storage unit with a next data segment stored in another storage unit, wherein the chained data segments form the original data in its contiguous form;
   setting a first data node that represents first data segment of the plurality of data segments in a first storage area;
   setting a second data node that represents a next data segment after the first data segment in the plurality of data segments in a second storage area;
   wherein said second data node is an element of a plurality of elements forming a first flat table of at least one flat table in the second storage area; and
   said step of setting the first data node includes storing in the first node a two-tuple linker which comprises a first identifier indicating said first flat table and a second identifier indicating a row of said element in the first flat table,
   wherein the data storage structure includes a first cascade of storage unit including N two-tuple linkers, which point to N flat table elements stored respectively in N storage units of a second cascade of storage unit, respectively, each of the storage units of the second cascade of storage unit including M two-tuple linkers, which point to M flat table elements stored respectively in M storage units of a third cascade of storage unit, respectively, wherein N and M are integers greater than one.

2. The method as claimed in claim 1, further comprising:
   storing in the first data node a piece of data together with said two-tuple linker.

3. The method of claim 2, wherein said step of setting the second data node further includes:
   storing in the second data node at least one two-tuple linker each comprising a first identifier indicating a second flat table of at least one flat table and a second identifier indicating an element of a plurality of elements in the second flat table.

4. The method of claim 2, wherein said first identifier points to the first flat table where next data segment to the piece of data stored in the first data node is located and said second identifier points to a row location in the first flat table where said next data segment is stored.

5. The method as claimed in claim 1, wherein said step of setting the second data node further includes:
   storing in the second data node at least one two-tuple linker each comprising a first identifier indicating a second flat table of at least one flat table and a second identifier indicating an element of a plurality of elements in the second flat table.

6. The method as claimed in claim 5, wherein the second flat table and the first flat table are the same flat table.

7. The method as claimed in claim 5, wherein the second flat table and the first flat table are different flat tables.

8. The method as claimed in claim 1, wherein said step of setting the second data node further includes:
   storing in the second data node a piece of data.

9. A data storage structure, comprising:
   a plurality of data segments making up a contiguous data to be stored;
   a plurality of storage units for storing the plurality of data segments in a form of a flat table, respectively, wherein a two-tuple linker is stored as part of the flat table to each of said plurality of storage units except for one used to store the last data segment of the plurality of data segments, the two-tuple linker chaining a data segment stored in a storage unit with a next data segment stored in another storage unit, wherein the chained data segments form the contiguous data
   a first data node that represents first data segment of the plurality of data segments set in a first storage area;
   a second data node that represents a next data segment after the first data segment in the plurality of data segments set in a second storage area;
   wherein said second data node is an element of a plurality of elements forming a first flat table of at least one flat table in the second storage area; and
   said first data node includes the two-tuple linker which comprises a first identifier indicating said first flat table and a second identifier indicating a row of said element in the first flat table,
   wherein the data storage structure includes a first cascade of storage unit including N two-tuple linkers, which point to N flat table elements stored respectively in N storage units of a second cascade of storage unit, respectively, each of the storage units of the second cascade of storage unit including M two-tuple linkers, which point to M flat table elements stored respectively in M storage units of a third cascade of storage unit, respectively, wherein N and M are integers greater than one.

10. The data storage structure as claimed in claim 9, wherein a piece of data is stored in the first data node.

11. The data storage structure as claimed in claim 9, wherein said second data node includes one or more two-tuple linkers, each of which includes a first identifier indicating a second flat table of the at least one flat table and a second identifier indicating an element of a plurality of elements in the second flat table.

12. The data storage structure as claimed in claim 11, wherein the second flat table and the first flat table are the same flat table.

13. The data storage structure as claimed in claim 11, wherein the second flat table and the first flat table are different flat tables.

14. The data storage structure as claimed in claim 9, wherein said second data node includes a piece of data.

15. The data storage structure as claimed in claim 9, wherein the first data node is a leaf node of tree-type storage architecture.

16. The data storage structure of claim 9, wherein said first identifier points to the first flat table where next data segment to the piece of data stored in the first data node is located and said second identifier points to a row location in the first flat table where said next data segment is stored.

* * * * *